United States Patent
Hofer et al.

(10) Patent No.: US 11,671,181 B2
(45) Date of Patent: Jun. 6, 2023

(54) BATTERY SYSTEM WITH LIGHT-BASED COMMUNICATION

(71) Applicant: Samsung SDI Co., Ltd., Yongin-si (KR)

(72) Inventors: Maximilian Hofer, Hartberg (AT); Roland Klobasa, Graz (AT); Gernot Kraberger, Graz (AT)

(73) Assignee: SAMSUNG SDI CO., LTD., Yongin-si (KR)

(*) Notice: Subject to any disclaimer, the term of this patent is extended or adjusted under 35 U.S.C. 154(b) by 18 days.

(21) Appl. No.: 17/181,169

(22) Filed: Feb. 22, 2021

(65) Prior Publication Data
US 2021/0306078 A1   Sep. 30, 2021

(30) Foreign Application Priority Data

Mar. 31, 2020   (EP) ..................................... 20167241
Feb. 16, 2021   (KR) ......................... 10-2021-0020651

(51) Int. Cl.
  *H01M 10/48* (2006.01)
  *H04B 10/80* (2013.01)
  *H01M 10/42* (2006.01)

(52) U.S. Cl.
  CPC ........ *H04B 10/801* (2013.01); *H01M 10/425* (2013.01); *H01M 10/482* (2013.01); *H01M 2010/4278* (2013.01)

(58) Field of Classification Search
  CPC .............. G06F 11/202; G05B 19/0425; G05B 19/0428; G05B 2219/24182; G05B 2219/24195; G05B 23/0221; G05B 9/03; H01M 10/425; H01M 10/482;
  (Continued)

(56) References Cited

U.S. PATENT DOCUMENTS 5,680,030 A * 10/1997 Kadouchi ........... H02J 7/00712
                                                    320/152
6,094,031 A    7/2000 Shimane et al.
(Continued)

FOREIGN PATENT DOCUMENTS

DE    10 2017 204 138 A1   9/2018

OTHER PUBLICATIONS

Extended European Search Report issued in EP 20167241.7, dated Oct. 1, 2020, 7 pages.
(Continued)

*Primary Examiner* — Victoria H Lynch
(74) *Attorney, Agent, or Firm* — Lewis Roca Rothgerber Christie LLP (57) ABSTRACT

A battery system includes a plurality of battery modules, each of the battery modules including a plurality of stacked battery cells and a battery module monitor (BMM) configured to monitor the respective battery cells; a battery system monitor (BSM) configured to communicate with and control the BMMs; a housing enclosing the battery modules and the BSM, the battery modules being arranged in the housing such that a swelling compensation channel is formed between the battery module and the housing; and an optical communication system (OCS) configured to connect the BSM with the BMMs via optical signals propagating along the swelling compensation channel.

19 Claims, 3 Drawing Sheets

(58) Field of Classification Search
CPC ....... H01M 2010/4278; H01M 50/242; H01M 50/264; H04B 10/801; Y02E 60/10
See application file for complete search history.

(56) References Cited

U.S. PATENT DOCUMENTS

| | | | |
|---|---|---|---|
| 2013/0207476 A1* | 8/2013 | Kang | H01M 10/482 307/80 |
| 2018/0109328 A1 | 4/2018 | Eberhard et al. | |
| 2019/0229376 A1 | 7/2019 | Petrakivskyi et al. | |

OTHER PUBLICATIONS

European Office Action dated Nov. 7, 2022 issued in EP Application No. 20167241.7-1108 (5 pages).

* cited by examiner

BATTERY SYSTEM WITH LIGHT-BASED COMMUNICATION

CROSS-REFERENCE TO RELATED APPLICATION

This application claims priority to and the benefit of European Patent Application No. 20167241.7, filed in the European Patent Office on Mar. 31, 2020, and Korean Patent Application No. 10-2021-0020651, filed in the Korean Intellectual Property Office on Feb. 16, 2021, the entire content of all of which are incorporated herein by reference.

BACKGROUND

1. Field

Aspects of embodiments of the present disclosure relate to a battery system with light-based communication.

2. Description of Related Art

A rechargeable (or secondary) battery differs from a primary battery in that it is designed to be repeatedly charged and discharged, while the latter provides an irreversible conversion of chemical to electrical energy. Low-capacity rechargeable batteries may be used as a power supply for small electronic devices, such as cellular phones, notebook computers, and camcorders, while high-capacity rechargeable batteries may be used as a power supply for hybrid and electric vehicles and the like.

Generally, rechargeable batteries include an electrode assembly including a positive electrode, a negative electrode, and a separator interposed between the positive and negative electrodes, a case receiving (or accommodating) the electrode assembly, and electrode terminals electrically respectively connected to the positive and negative electrodes of the electrode assembly. An electrolyte solution is injected into the case to enable charging and discharging of the battery via an electrochemical reaction of the positive electrode, the negative electrode, and the electrolyte solution. The shape of the case, for example, a cylindrical or prismatic shape, depends on the battery's intended purpose.

Rechargeable batteries may be used as (or included in) a battery module including a plurality of unit battery cells coupled to each other in series and/or in parallel to provide relatively high energy density, for example, high voltage and capacity, for, as an example, an electric vehicle. The battery module may be formed by interconnecting the electrode terminals of the plurality of unit battery cells, the number and connection configuration of which depends on a desired amount of power, to provide a high-power rechargeable battery for, as an example, an electric vehicle. Battery modules are mechanically and electrically integrated, equipped with a passive or active thermal management system, and configured for communication with electrical loads to form a battery system. Aspects of such mechanical and electric integration and thermal management may not be necessary for one skilled in the art to have a complete understanding of the present disclosure and, thus, may be omitted.

Battery modules may be constructed either in block design or in modular design. In the block design, each battery cell is coupled to a common current collector structure and a common battery system manager. In the modular design, pluralities of battery cells are connected to each other to form submodules, and several submodules are connected to each other to form the battery module. Battery management functions may be provided either on the module or submodule level and, thus, interchangeability of the components is improved. One or more battery modules are mechanically and electrically integrated, equipped with a thermal management system, and configured for communication with one or more electrical consumers to form a battery system.

Static control of the battery power output and charging may not be sufficient to meet the dynamic power demands of the various electrical loads connected to the battery system. Thus, steady or intermittent exchange of information between the battery system and the controllers of the electrical consumers may be used. This information includes the battery system's actual state of charge (SoC), potential electrical performance, charging ability, and internal resistance as well as the consumer's actual or predicted power demands or surpluses.

A battery system generally includes one or more of a battery system monitor (BSM), a battery disconnect unit (BDU), and a battery module monitor (BMM) to monitor, control, and/or set the aforementioned parameters. Such control units may be an integral part of the battery system and disposed within a common housing or may be part of a remote control unit communicating with the battery system via a suitable communication bus.

These control units may perform various functions in the battery system. A BMM is equipped on the battery's module or submodule level and is configured to measure cell voltages and, in some cases, temperatures, to provide cell balancing within the modules. A plurality of BMMs is usually connected for data transmission among each other and with a BSM, and the BSM receives the measured data, such as voltage (and possibly temperature) data, from all of the battery modules, controls the battery system as a whole, and provides a communication interface to an exterior of the battery system for communicating with the electrical consumers via a suitable communication bus, such as a CAN or SPI interface.

The BSM is usually coupled to the controller of one or more electrical consumers as well as to each of the BMMs of the battery modules of the battery system. A daisy chain connection configuration may be used so that a single BSM can control a plurality of battery modules. In such a setup, the BSM, as master, is connected for communication in series to a plurality of battery modules, such as to the plurality of battery module monitors (BMM) of the respective battery modules.

Figure 1:
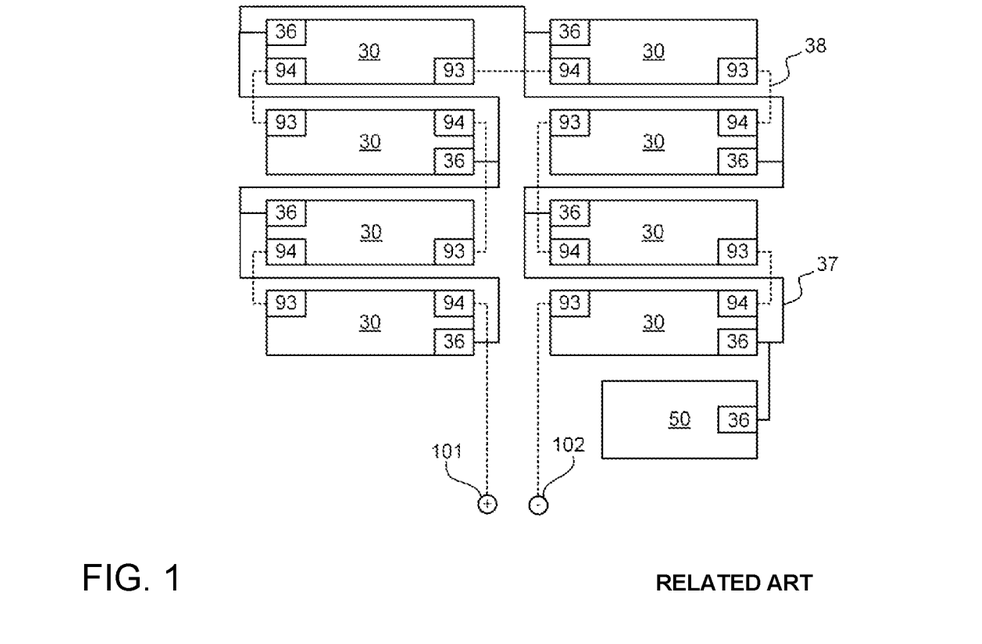
FIG. 1 is a schematic top view of a battery system according to the related art.

An exemplary battery system with a daisy chain setup according to the prior art is illustrated in FIG. 1. Therein, a BSM 50 is configured to communicate with a plurality of BMMs 30 of battery modules, and each BMM 30 includes a negative module terminal 93 and a positive module terminal 94. The module terminals 93, 94 of the BMMs 30 are power connected to each other via busbars 38 and peripheral module terminals 93, 94 are power connected to system terminals 101, 102, respectively. Each BMM 30 further includes a connector 36 for setting up a daisy chain with the BSM 50, which also includes a connector 36, using a wiring harness 37 connecting the all of the connectors 36 with each other in a serial configuration.

Using the wiring harness 37 provides flexibility for positioning the connectors 36 due to the mechanical flexibility of the wiring harness 37 itself. However, the wire-based connections of the wiring harness 37 are susceptible to failure by electromagnetic disturbances and are sources for EM disturbances themselves. Hence, screening or EMI shielding of the wiring harness 37 is required, further limiting the already limited available construction space for the wiring harness 37. Also, the material and assembly costs of the wire harness increase the battery system's overall costs.

SUMMARY

Light-based communication may be used in a battery system. However, light-based communication is susceptible to line-of-sight obstructions between a light transmitter and receiver, which may deteriorate the communication. Also, reflection and/or absorption properties of the battery system's components may interfere with the light medium used for communication and should be considered.

Thus, the use of light-based communication in battery systems usually requires mirrors and/or housing components that provide an obstruction-free light communication path, which increases the complexity and the costs of the battery system as whole.

According to embodiments of the present disclosure, a battery system with light-based communication between a BSM and battery modules is provided that is of low complexity and manufacturing costs.

One or more of the drawbacks of the prior art may be avoided or at least mitigated according to aspects and features of the present disclosure. For example, a battery system is provided that includes a plurality of battery modules, and each of the plurality of battery modules includes a plurality of stacked (or aligned) battery cells that are interconnected between module terminals. Further, each of the battery modules includes a battery module monitor (BMM) that is configured to monitor the cells. For example, each of the BMMs may be configured to measure, for example, voltages, currents, and/or temperatures of the cells of the respective battery module and may further be configured to perform cell balancing between the battery cells of the battery modules. In the context of the present disclosure, the term "battery module" may refer to a battery module described here or may refer to a battery submodule as described in the introduction. However, the battery module described here may also include further components.

The battery system further includes a battery system monitor (BSM) that is configured to communicate with and control the BMM of each battery module. The BMS may be configured to receive voltage data from the BMMs of all of the battery modules and configured to control the battery system as a whole. The BSM may be configured to provide a communication interface to an exterior of the battery system for communicating with electrical loads connected thereto.

The battery system according to an embodiment of the present disclosure may further include a housing that encloses the plurality of battery modules and the BSM. The housing may include a ground plate, a plurality of side walls, and a cover, the combination of which encloses the battery modules and the BSM from all sides. At least one of the aforementioned components may be removable to, for example, allow service access to the battery system. The battery system may be made of a metal, such as aluminum or steel, or may be made of a plastic material.

In the battery system according to an embodiment of the present disclosure, the battery modules are arranged in the housing such that at least one swelling compensation channel is formed between the battery modules and/or between the battery modules and the housing. For example, the battery modules are arranged such that sufficient space is provided between the battery modules and/or the housing to account for swelling of the battery modules, including sufficient space to compensate for battery cell swelling during operation of the battery modules.

The battery system according to an embodiment of the present disclosure further includes an optical communication system (OCS), which is configured to connect the BSM with at least the BMM of each battery module via optical signals. The OCS may be configured such that the optical signals propagate inside at least one swelling compensation channel as described above. For example, the OCS may be integrated into the swelling compensation channels of a battery system, and the swelling compensation channels may be commonly provided to housed battery systems to account for swelling. Hence, the OCS does not require any additional construction space requirements.

The OCS of the battery system is a free-space optical communication system (FSO). For example, the OCS uses light propagating in the free space of the swelling compensation channels to wirelessly transmit data between the BSM and BMMs. In the context of the present disclosure, the term "free space" refers to air or another gas (e.g., a gas mixture) inside the housing and does not refer to solids, such as an optical fiber cable.

In an embodiment of the present disclosure, the battery modules are arranged in at least one row of battery modules. For example, the battery modules are stacked in a linear manner in a row direction. According to this embodiment, at least one swelling compensation channel extends adjacent to and along a row of battery modules. For example, the swelling compensation channel may extend between two adjacent rows of battery modules or may extend between a row of battery modules and the housing. Usually, battery modules are arranged in rows of battery modules such that the side walls of the stacked battery modules are aligned with each other. Hence, the swelling compensation channel can extend unobstructed along the entire row of battery modules and, in some cases, even though the whole system.

Further, the swelling direction of the battery modules may point toward the at least one swelling compensation channel, such as to a swelling compensation channel adjacent to the respective battery modules. For example, the swelling direction of the battery modules of a row of battery modules points toward the at least one swelling compensation channel extending adjacent to and along that row of battery modules. In other words, the relative positioning of the battery modules and the swelling compensation channels takes into consideration the swelling direction (S) of the battery modules to ensure reliable swelling compensation.

In some embodiments, each battery cell of the battery system includes a battery cell housing having a pair of wide side surfaces facing each other and a pair of narrow side surfaces facing each other and may be, for example, a prismatic battery cell housing. According to this embodiment, each battery module is formed by stacking the battery cells together with their wide side surfaces facing each other, such that the narrow side surfaces of all stacked battery cells form the side surface of the battery module. In this embodiment, the swelling direction (S) of each battery cell points in a normal direction of the wide side surfaces of that battery cell because the wide side surfaces are usually most prone to buckling when internal pressure increases. Thus, the swelling direction of a battery module is, in some embodiments, parallel to its stacking direction.

The swelling compensation channels may be configured to allow for compensation of tolerances, such as manufacturing tolerances or tolerances in thermal expansion or the like. The swelling compensation channels may be configured to contribute to electric and/or thermal insulation of the modules in normal operation or in thermal runaway operation. Also, the swelling compensation channels may allow for unhindered (or substantially unhindered) vent gas flow between individual or compartmentalized battery modules in a thermal runaway situation, when such functions do not necessarily relate to a swelling direction of the battery cells.

The OCS of the battery system may include a plurality of optical transmitters and a plurality of optical receivers, which are configured to communicate with each other via the optical signals that are transmitted/received along the swelling compensation channel(s). Therein, the optical transmitters are configured to generate and output optical signals based on an analog or digital input signal. The optical receivers are configured to receive the optical signals and to generate and output an analog or digital output signal. Therein, the output signal resembles the input signal at least to a certain extent. The optical transmitters and optical receivers may be integral components of the battery system components (e.g., the BSM, BMM, and BDU as described below) or may be separate components. When they are separate components, the connection to the battery system components may be via wires.

In some embodiments, each BMM of the battery system includes at least one optical transmitter configured to transmit signals to the BSM and at least one optical receiver configured to receive signals from the BSM. The optical transmitters and optical receivers may be connected to a transceiving control circuitry of the respective BMM, which is configured to control the operation of the transmitter/receiver to, for example, generate optical signals based on an internal input signal and to generate an output signal based on external optical signals.

The BSM may include at least one optical transmitter and at least one optical receiver of the OCS. For example, the BSM may include a single optical transmitter configured to transmit optical signals to the optical receivers of all of the BMMs and may include a single optical receiver configured to receive optical signals from the optical transmitters of all of the BMMs. However, the BSM may also include a plurality of optical transmitters, each optical transmitter being configured to transmit signals to an individual BMM or a group of the BMMs. Similarly, the BSM may include a plurality of optical receivers, each optical receiver being configured to receive signals from an individual BMM or from a group of BMMs. For example, direct communication may be established between a BSM and each individual BMM. However, when the BSM includes fewer optical transmitters/receivers than there are BMMs in the battery system, the communication between BSM and the BMMs may be sequential. However, the optical signals transmitted by the BSM may also be received by the optical receiver of each BMM and converted to an output signal, and an identifier of a BMM may be included in the output signal to identify the actual sender or recipient of the optical signal.

In another embodiment, the battery system further includes a battery disconnect unit (BDU), which includes an optical transmitter and an optical receiver of the OCS. The BDU may be configured to communicate with the BSM and to selectively connect or disconnect the plurality of battery modules from downstream loads under control of the BSM. Therefore, the BDU may include one or more relays or fuses interconnected between the plurality of battery modules and a system power terminal of the battery system. The relays of the BDU may be controlled by the BSM in response to a state of the battery system as detected by the BSM. For example, the BSM may control the relays to open if a malfunction is detected in the battery system, for example based on the communication with the plurality of BMMs. The BSM communicates with and controls the BDU via optical signals that propagate to the optical transmitter and from the optical receiver of the BDU inside a swelling compensation channel, and in some embodiments, this channel may be the same or different from those used for communication between the BSM and the BMMs. Due to high security requirements related to the operation of the BDU, an individual channel may be used for that communication.

In the battery system according to an embodiment of the present disclosure, each swelling compensation channel may provide a direct line of sight between the at least one optical transmitter of the BSM and the optical receivers of the BMM and/or of the BDU. Likewise, each swelling compensation channel may provide a direct line of sight between the at least one optical receiver of the BSM and the optical transmitters of the BMM and/or of the BDU. Hence, the optical signals can propagate between the BSM and the BMMs/BDU without the use of any additional components, such as glass fibres, mirrors, or the like. The swelling compensation channels usually extend in a linear manner along the rows of battery modules and through a whole battery system. Hence, optical communication can be carried out unobstructed via the swelling compensation channels.

In one embodiment, an optical transmitter of a first BMM is spatial offset with respect to a direct line of sight between an optical transmitter of a second BMM (different from the first BMM) and an optical receiver of the BSM. For example, the optical transmitter of the first BMM is not arranged in the direct line of sight between the optical transmitter of a second BMM and an optical receiver of the BSM. Further, an optical receiver of a first BMM may be spatial offset with respect to a direct line of sight between an optical receiver of a second BMM (different from the first BMM) and an optical transmitter of the BSM. Hence, the communication between the first BMM and the BSM is not interfered with by the communication between the second BMM and the BSM. In this embodiment, a first BMM is different from a second BMM, and a first BMM can be termed a second BMM with respect to another BMM. in one embodiment, the optical transmitters and/or the optical receivers of all the BMMs are arranged with a spatial offset with respect to each other. Thus, interference between the BMM communications is avoided.

In some embodiments, the optical transmitters and the optical receivers are coupled (or mounted) to the BMMs via respective mounts (e.g., mounting structures). For example, each optical transmitter and optical receiver is mounted to a BMM with a respective mounting structure. In such an embodiment, the spatial offsets of a transmitter/receiver of a first BMM from the direct line of sight of the transmitter/receiver of a second BMM is realized by using mounts having different sizes for the different BMMs. For example, a first mounting structure for the first BMM and a second mounting structure for the second BMM may have different sizes from each other. For an individual BMM, the optical transmitter and optical receiver may be coupled via a single mount or separate mounts, also of different sizes in some embodiments, may be used to couple transmitter and receiver to the BMM.

Alternatively or additionally, the spatial offsets between the optical transmitters and optical receivers of different BMMs may be provided by spatial offsets of the battery modules with respect to the swelling compensation channel.

For example, instead of using different mounts to provide the spatial offset, mounts having the same size may be used and the positioning of different battery modules with respect to the swelling compensation channel differs. In this embodiment, the swelling compensation channel may have a stepped shape.

Also, the different lines of sights between individual optical transmitters of BMMs and the BSM may be realized in that the optical transmitters of individual BMMs point toward the BSM at different angles. In such an embodiment, the BSM may include a spatially extended optical receiver and a BMM may be identified based on a position of a detector area actually receiving the optical signal from that specific BMM. Further, different lines of sights between individual optical receivers of BMMs and the BSM may be realized in that the optical receivers of individual BMMs point toward the BSM at different angles. In such embodiment, the BSM may include multiple optical transmitters or an optical transmitter that is rotatable mounted to the BSM for emitting signals in different directions.

In some embodiments, the OCS of the battery system is configured to operate with infrared light; for example, the optical transmitters are infrared transmitters and the optical receivers are infrared receivers. However, other optical communication systems may be employed such as, for example, a laser-based communication system or visible light communication systems. Various suitable optical communication systems are known to those skilled in the art. Further, the optical transmitters of the battery system may include at least one light emitting diode (LED) and the optical receivers may be a photodiode, phototransistors, or the like.

Further, at least one reflecting surface may be disposed within the housing, for example, as additional component, as part of the housing, or as part of one or more battery modules. The reflecting surface may be configured to reflect light emitted from an optical transmitter, as described above, to a corresponding optical receiver, as described above. For example, the optical signals may be deflected (or reflected) between the BSM and the BMMs/BDU. For example, the optical transmitters/receivers itself may not be disposed in the at least one swelling compensation channel but the swelling compensation channel may nevertheless be used as a signal pathway by deflecting the optical signals in and out of the swelling compensation channel. Hence, the degrees of freedom in placing (or arranging) the transmitters/receivers can be further increased.

In another embodiment, the BSM includes a plurality of optical transmitters and, for each optical transmitter, a direct line of sight exists towards one optical receiver of a respective BMM. For example, direct communication is realized between the BSM and the BMMs. Further, direct communication may be provided for a backward channel in that the BSM includes a plurality of optical receivers and, for each optical receiver, a direct line of sight exists towards one optical transmitter of a respective BMM. However, a mix of directed and non-directed communication for forward and backward channel may be used.

Another aspect of the present disclosure relates to an electric vehicle including a battery system according to an embodiment of the present disclosure as described above. Further aspects of the present disclosure may be learned from the dependent claims and/or the following description.

BRIEF DESCRIPTION OF THE DRAWINGS

Aspects and features of the present disclosure will become apparent to those of ordinary skill in the art by describing, in detail, exemplary embodiments thereof with reference to the attached drawings, in which.

DETAILED DESCRIPTION

Reference will now be made, in detail, to embodiments, examples of which are illustrated in the accompanying drawings. Aspects and features of the exemplary embodiments, and implementation methods thereof, will be described with reference to the accompanying drawings. In the drawings, like reference numerals denote like elements, and redundant descriptions may be omitted. The present disclosure, however, may be embodied in various different forms and should not be construed as being limited to the embodiments illustrated herein. Rather, these embodiments are provided as examples so that this disclosure will be thorough and complete, and will fully convey the aspects and features of the present disclosure to those skilled in the art. Accordingly, processes, elements, and techniques that are not considered necessary to those having ordinary skill in the art for a complete understanding of the features of the present disclosure may not be described. In the drawings, the relative sizes of elements, layers, and regions may be exaggerated for clarity.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the term "and/or" includes any and all combinations of one or more of the associated listed items. Further, the use of "may" when describing embodiments of the present disclosure refers to "one or more embodiments of the present disclosure." In the following description of embodiments of the present disclosure, the terms of a singular form may include plural forms unless the context clearly indicates otherwise. Expressions, such as "at least one of," when preceding a list of elements, modify the entire list of elements and do not modify the individual elements of the list. It will be understood that although the terms "first" and "second" are used to describe various elements, these elements should not be limited by these terms. These terms are only used to distinguish one element from another element. For example, a first element may be named a second element and, similarly, a second element may be named a first element, without departing from the disclosure.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed numerically value, the term "substantially" denotes a range of +/−5%.

FIG. 1 shows a daisy chain setup according to the related art and was described above.

Figure 2:
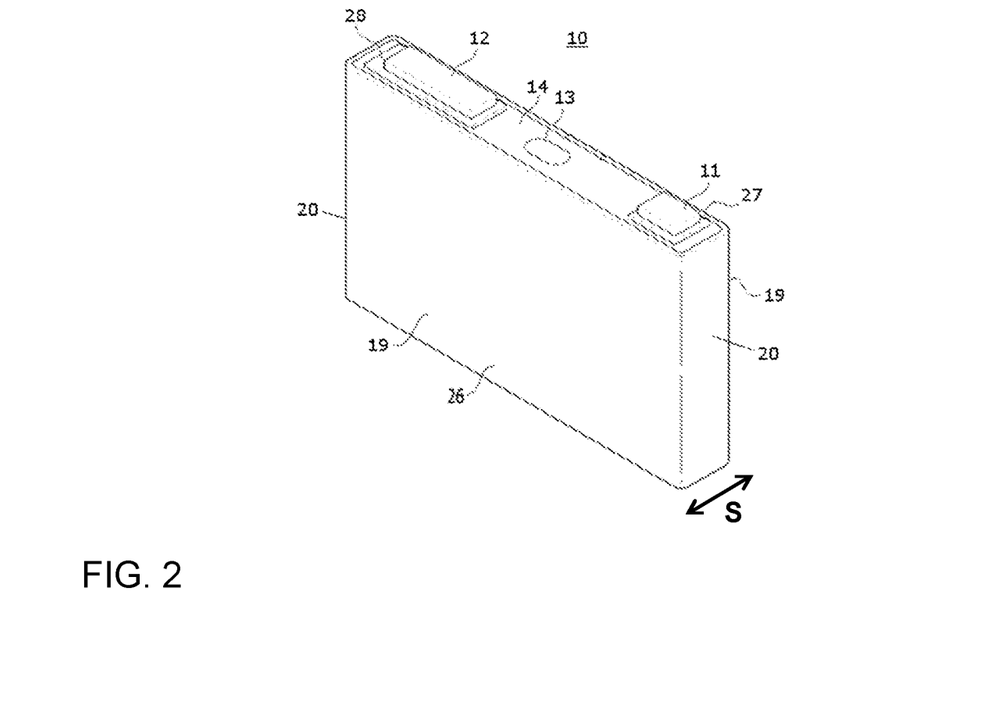
FIG. 2 is a perspective view of a battery cell according to an embodiment.

FIG. 2 is a perspective view of a battery cell 10 according to an embodiment.

As shown in FIG. 2, the battery cell 10 includes a case 26 for accommodating an electrode assembly and to contain an electrolyte. The battery cell 10 further includes a cap assembly 14 for sealing an opening in the case 26. The case 26 has a substantially cuboidal shape, and the opening is formed at one side thereof. The case 26 includes (or is formed of) a metal, such as aluminum, and has a bottom surface having a substantially rectangular shape, a pair of first lateral walls that are=wide side surfaces 19, and a pair of second lateral walls that are narrow side surfaces 20. The first lateral walls 19 face each other, and the second lateral walls 20 face each other and are connected to (e.g., extend from) the first lateral walls 19. A length of an edge at where the cap assembly 14 and a first lateral wall 19 are connected to each other is longer than that of an edge at where the cap assembly 14 and the second lateral walls 20 are connected to each other.

The cap assembly 14 is a cap plate for covering (e.g., sealing) the opening in the case 26 by being bonded to the case 26 and further includes a positive terminal (e.g., a first terminal) 11 and a negative terminal (e.g., a second terminal) 12, which are externally protruded from the cap plate 14. The cap plate 14 includes a vent opening (e.g., a vent hole) 13 that communicates with an interior of the cell 10. The vent opening 13 is configured to open due to a reference pressure (e.g., a predetermined pressure) inside the case 26. The positive terminal 11 and the negative terminal 12 protrude upwardly from the cap plate 14. A connecting plate 27 for electrically connecting the positive terminal 11 and the cap plate 14 is mounted between the positive terminal 11 and the cap plate 14 such that the cap plate 14 and the case 26 are electrified with same polarity as the positive terminal 11. An upper insulating member 28 for electrically insulating the negative terminal 12 from the cap plate 14 is mounted between the negative terminal 12 and the cap plate 14 for insulation (e.g., electrical insulation).

Figure 3:
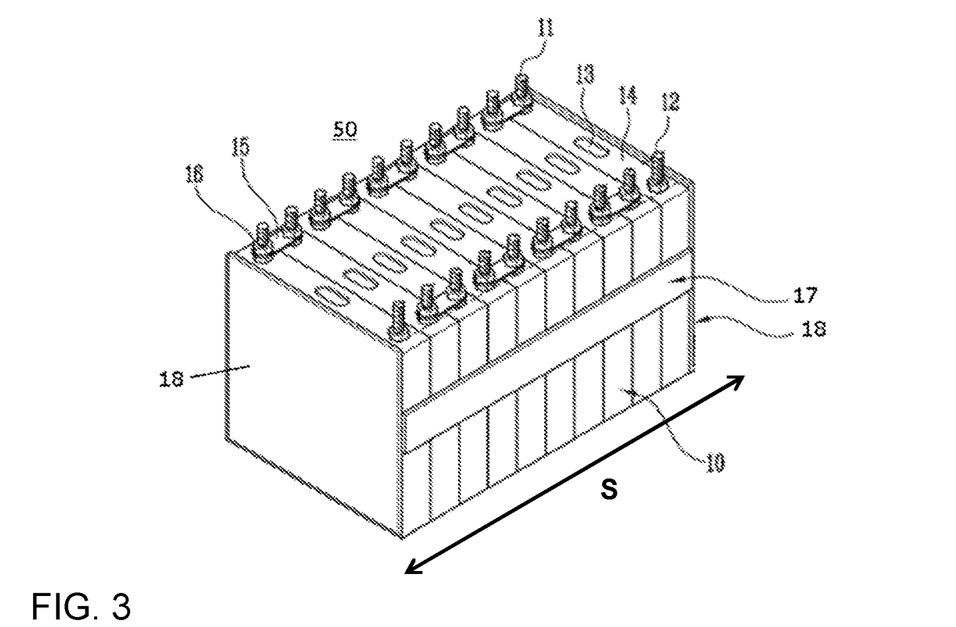
FIG. 3 is a perspective view of a battery module according to an embodiment.

Referring to FIG. 3, an exemplary embodiment of a battery module 50 includes a plurality of battery cells 10 aligned in one direction. A pair of end plates 18 are provided to face wide surfaces 19 of the battery cells 10 at the outside of the battery cells 10, and connection plates 17 extend along the narrow side surfaces 20 and are configured to connect the pair of end plates 18 to each other, thereby fixing the plurality of battery cells 10 together. Here, each battery cell 10 is a prismatic (e.g., rectangular) cell, and the wide side surfaces 19 of the cells 10 are stacked together to form the battery module 50. Further, the positive and negative electrode terminals 11 and 12 of neighboring cells 10 are electrically connected through a bus bar 15, and the bus bar 15 may be fixed by a nut 16, welding, etc.

Figure 4:
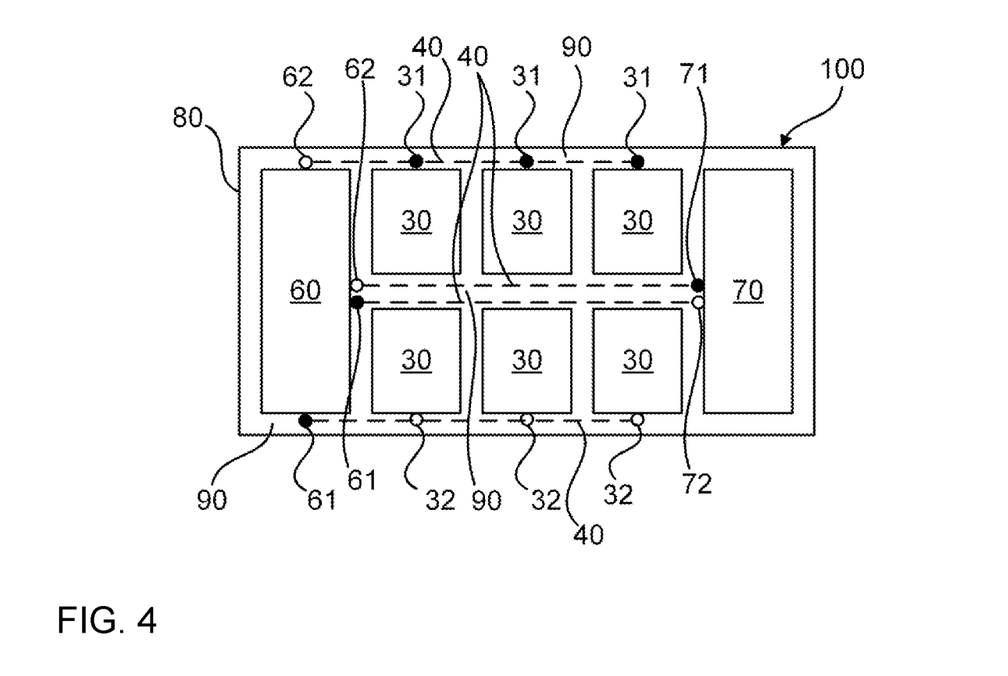
FIG. 4 is a schematic top view of a battery system according to an embodiment.

Referring to FIG. 4, a schematic top view of a battery system 100 according to an embodiment is shown. The battery system 100 includes a plurality of battery modules (e.g., six battery modules) that are indicated by the battery module monitors (BMMs) 30, which are disposed on top of each battery module. The battery system 100 further includes a battery system monitor (BSM) 60 and a battery disconnect unit (BDU) 70. The battery modules (e.g., BMM) 30, BSM 60, and BDU 70 are disposed in a housing 80 that laterally encloses all of these components.

Figure 5:
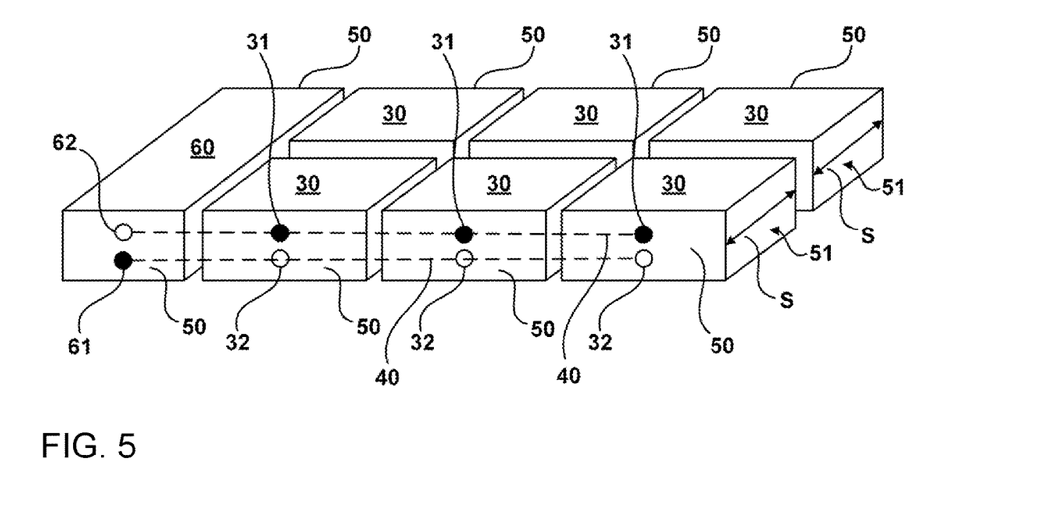
FIG. 5 is a schematic perspective view of a section of the battery system shown in FIG. 4.

FIG. 5 illustrates a schematic perspective view of a section of the battery system 100 shown in FIG. 4, particularly of the battery system 100 shown in FIG. 4 with the BDU 70 omitted for clarity. Referring to FIGS. 4 and 5, the battery modules (and BMMs 30) of the battery system 100 are arranged in a plurality of rows (e.g., two rows) 51, and each row 51 includes a plurality of (e.g., three) battery modules (and BMMs 30). A swelling compensation channel 90 is formed between the rows of battery modules (and BMMs 30) and further swelling compensation channels 90 are respectively formed between the rows of battery modules (and BMMs 30) and the housing 80. Therein, the battery modules are arranged such that a primary swelling direction S (see, e.g., FIG. 3) is toward (or into) the swelling compensation channels 90, for example, so that the swelling direction S is perpendicular to a longitudinal direction of the swelling compensation channels 90. As illustrated in FIG. 2, the primary swelling direction S of an individual battery cell 10 is normal to its wide side surfaces 19. Hence, when the cells 10 are stacked (or aligned) with their wide side surfaces 19 facing each other as in the battery module 50 shown in FIG. 3, the primary swelling direction S of the module 50 is parallel to its stacking direction. Hence, in the battery system 100 shown in FIGS. 4 and 5, the stacking direction of the battery modules 50 is perpendicular to the longitudinal direction of the swelling compensation channels 90. Hence, the swelling of the battery cells 10 and modules 50 is compensated by the free space in the swelling compensation channels 90 to avoid damage.

Referring again to FIGS. 4 and 5, the BSM 60 includes a plurality of (e.g., three) optical transmitters 61 and a plurality of (e.g., three) optical receivers 62. As shown in FIG. 4, one optical transmitter 61 is arranged at a lower lateral side of the BSM 60 and is configured to perform a forward communication with the plurality of BMMs 30 in the lower row of battery modules. Therein, each BMM 30 includes an optical receiver 32 that is in direct line of sight with the optical transmitter 61 of the BSM 60 within the lowermost swelling compensation channel 90. As further shown in FIG. 4, an optical receiver 62 is arranged at an upper lateral side of the BSM 60 and is configured to perform a backward communication with the plurality of BMMs 30 in the upper row of battery modules. Therein, each BMM 30 includes an optical transmitter 31 that is in direct line of sight with the optical receiver 62 of the BSM 60 within the uppermost swelling compensation channel 90. As further shown in FIG.

4, the BSM 60 includes another optical transmitter 61 and another optical receiver 62 that are disposed at a right lateral side of the BSM 60 and are in direct line of sight with an optical receiver 72 and an optical transmitter 71, respectively, of the BDU 70 within a middle swelling compensation channel 90. As shown in FIG. 5, another optical receiver 62 exists for backward communication with the BMMs 30 in the lower row 51, each BMM 30 of which also includes an optical transmitter 31. The optical transmitters 31 and the other optical receiver 62 are not shown in FIG. 4. The same configuration exists for the BMMs 30 in the upper row 51, which are also set up for forward and backward communication with the BSM 60.

Figure 6:
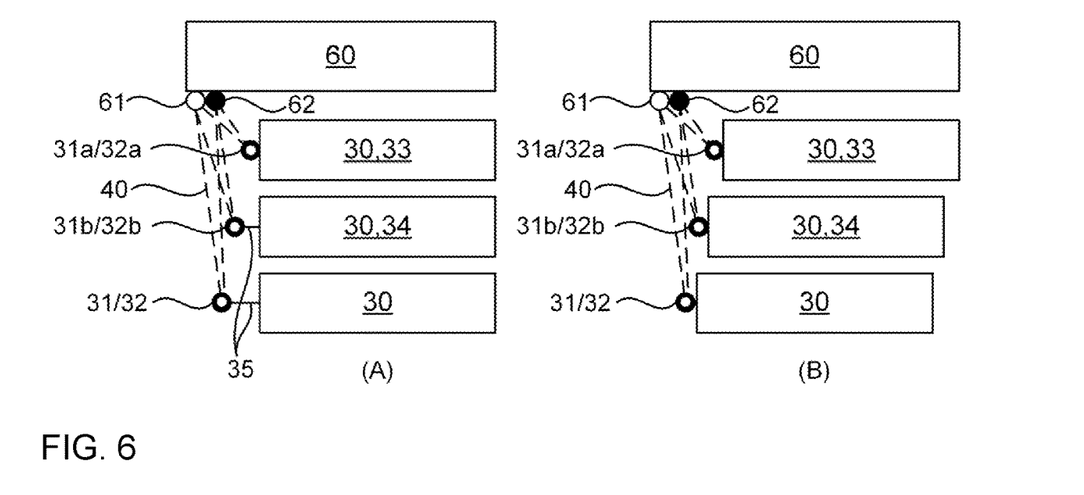
FIG. 6 schematically illustrates communication between a battery system monitor (BSM) and a plurality of battery module monitors (BMMs).

FIG. 6 schematically illustrates communication between a battery system monitor (BSM) 60 and a plurality of battery module monitors (BMMs 30) according to an embodiment. Therein, FIGS. 6 (A) and (B) illustrate that an optical transmitter 31a of a first BMM 33 is spatially offset with respect to a direct line of sight between an optical transmitter 31b of a second BMM 34 and an optical receiver 62 of the BSM 60. FIGS. 6 (A) and (B) further illustrate that an optical receiver 32a of the first BMM 33 is spatially offset with respect to a direct line of sight between an optical receiver 32b of the second BMM 34 and an optical transmitter 61 of the BSM 60. Therein, the uppermost BMM 30 is the first BMM 33, and the middle BMM 30 is the second BMM 34; however, this could also be reversed and the middle BMM could be the first BMM 33, and the lowermost BMM 30 could be the second BMM 34. Although the spatial offsets are realized by mounting structures 35 of different sizes that mount the optical transmitters 31 and optical receivers 32 (commonly illustrated as thick black circles) to the BMMs 30 in FIG. 6(A), FIG. 6(B) shows an embodiment in which the spatial offsets are realized by offsetting the BMMs 30 themselves.

The electronic (or electric) devices and/or any other relevant devices or components according to embodiments of the present disclosure described herein may be implemented by utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, for example, on a PCB or another kind of circuit carrier. The conducting elements may include metallization, such as surface metallizations and/or pins, and/or may include conductive polymers or ceramics. Further, electrical energy may be transmitted via wireless connections, for example, by using electromagnetic radiation and/or light.

Further, the various components of these devices may be a process or thread running on one or more processors in one or more computing devices, executing computer program instructions and interacting with other system components for performing the various functionalities described herein. The computer program instructions are stored in a memory, which may be implemented in a computing device using a standard memory device, such as, for example, a random access memory (RAM). The computer program instructions may also be stored in other non-transitory computer readable media, such as, for example, a CD-ROM, flash drive, or the like.

Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

SOME REFERENCE NUMERALS 10 battery cell
11 first terminal
12 second terminal
13 vent opening
14 cap plate
15 busbar
16 nut
17 connection plate
18 end plates
19 wide side surfaces
20 narrow side surfaces
26 battery cell housing
27 connecting plate
28 upper insulating member
30 battery module monitor (BMM)
31a/b first/second optical transmitter of BMM
32a/b first/second optical receiver of BMM
33 first BMM
34 second BMM
35 mounting structure
36 connector
37 wiring harness
38 busbar
40 optical signal
50 battery module
51 row of battery modules
60 battery system monitor (BSM)
61 optical transmitter of BSM
62 optical receiver of BSM
70 battery disconnect unit (BDU)
71 optical transmitter of BDU
72 optical receiver of BDU
80 battery system housing
90 swelling compensation channel
100 battery system
101 positive battery system terminal
102 negative battery system terminal
S primary swelling direction

What is claimed is:

1. A battery system comprising:
   battery modules, each of the battery modules comprising battery cells in a stacked arrangement and a battery module monitor (BMM) configured to monitor the respective battery cells;
   a battery system monitor (BSM) configured to communicate with and control the BMMs;
   a housing enclosing the battery modules and the BSM, the battery modules being arranged in the housing such that a swelling compensation channel is formed between the battery modules and the housing; and
   an optical communication system (OCS) comprising optical transmitters and optical receivers on the battery modules and on the BSM and configured to connect the BSM with the BMMs via optical signals propagating along the swelling compensation channel,
   wherein a first one of the optical transmitters is on the BMM of a first one of the battery modules and a second one of the optical transmitters is on the BMM of a second one of the battery modules, and wherein a first distance between the first one of the optical transmitters and the BMM of the first one of the battery modules is different from a second distance between the second one of the optical transmitters and the BMM of the second one of the battery modules.

2. The battery system according to claim 1, wherein the battery modules are arranged in a row, and wherein the swelling compensation channel is adjacent to and extends along the row of the battery modules.

3. The battery system according to claim 2, wherein the battery modules are arranged such that a primary swelling direction of the battery modules points toward the swelling compensation channel.

4. The battery system according to claim 3, wherein each of the battery cells comprises a battery cell housing having a pair of wide side surfaces facing each other and a pair of narrow side surfaces facing each other, wherein the battery cells in each of the respective battery modules are stacked together with their wide side surfaces facing each other, and wherein a primary swelling direction of each of the battery cells is normal to the wide side surfaces thereof.

5. The battery system according to claim 1, wherein at least one of the optical transmitters and at least one of the optical receivers is on the BMM of each of the battery modules.

6. The battery system according to claim 5, wherein at least one of the optical transmitters and at least one of the optical receivers are on the BSM.

7. The battery system according to claim 6, further comprising a battery disconnect unit (BDU), at least one of the optical transmitters and at least one of the optical receivers being on the BDU, wherein the BSM is configured to communicate with and control the BDU via optical signals that propagate to the optical transmitter on the BDU or from the optical receiver of the BDU between adjacent rows of the battery modules.

8. The battery system according to claim 7, wherein a of swelling compensation channels are formed in the housing, and wherein each of the swelling compensation channels provides a direct line of sight between the optical transmitters and the optical receivers on the BSM and the optical transmitters and the optical receivers on the BMMs and/or on the BDU.

9. The battery system according to claim 1, wherein a first one of the optical receivers is on the BSM, and wherein the first one of the optical transmitters is spatially offset with respect to a direct line of sight between the second one of the optical transmitters and the first one of the optical receivers.

10. The battery system according to claim 9, wherein the optical transmitters are respectively coupled to the BMMs via mounts, respectively, and wherein different ones of the mounts have different sizes to provide spatial offsets between the optical transmitters on different ones of the BMMs and the optical receiver the BSM.

11. The battery system according to claim 9, wherein the battery modules are spatially offset with respect to the swelling compensation channel to provide spatial offsets between the optical transmitters on different ones of the BMMs and the first one of the optical receivers on the BSM.

12. The battery system according to claim 1, wherein a first one of the optical receivers is on the BMM of the first one of the battery modules, a second one of the optical receivers is on the BMM of the second one of the battery modules, and a third one of the optical transmitters is on the BSM, and wherein the first one of the optical receivers is a spatially offset with respect to a direct line of sight between the second one of the optical receivers and the third one of the optical transmitters.

13. The battery system according to claim 12, wherein the optical transmitters are coupled to the BMMs via mounts, respectively, and wherein different ones of the mounts have different sizes to provide spatial offsets between the optical transmitters on different ones of the BMMs and the optical receiver on the BSM.

14. The battery system according to claim 12, wherein the battery modules are spatially offset with respect to the swelling compensation channel to provide spatial offsets between the optical transmitters of different ones of the BMMs and the optical receiver of the BSM.

15. The battery system according to claim 1, wherein a first one of the optical receivers is on the BSM, and wherein a direct line of sight between the first one of the optical transmitters and the first one of the optical receivers is angled with respect to a direct line of sight between the second one of the optical transmitters and the first one of the optical receivers.

16. The battery system according to claim 1, wherein a first one of the optical receivers is on the BMM of the first one of the battery modules, a second one of the optical receivers is on the BMM of the second one of the battery modules, and a third one of the optical transmitters is on the BSM, and wherein a direct line of sight between the first one of the optical receivers and the third one of the optical transmitters is angled with respect to a direct line of sight between the second one of the optical receivers and the third one of the optical transmitters.

17. The battery system according to claim 1, wherein the OCS is configured to operate with infrared light as the optical signals.

18. The battery system according to claim 1, wherein a reflecting surface is arranged within the housing and is configured to reflect light emitted from at least one of the optical transmitters to a corresponding one of the optical receivers.

19. The battery system according to claim 1, wherein a third one of the optical transmitters and a fourth one of the optical transmitters are on the BSM, and wherein each of the third one of the optical transmitters and the fourth one of the optical transmitters has a direct line of sight to the optical receiver on a respective one of the BMMs.

* * * * *

UNITED STATES PATENT AND TRADEMARK OFFICE
CERTIFICATE OF CORRECTION

| | |
|---|---|
| PATENT NO. | : 11,671,181 B2 |
| APPLICATION NO. | : 17/181169 |
| DATED | : June 6, 2023 |
| INVENTOR(S) | : Maximilian Hofer et al. |

It is certified that error appears in the above-identified patent and that said Letters Patent is hereby corrected as shown below:

In the Claims

Column 13, Line 41, Claim 8    Delete "wherein a of" and
    Insert -- wherein --

Column 13, Line 61, Claim 10    Delete "receiver the" and
    Insert -- receiver on the --

Signed and Sealed this
Twenty-second Day of August, 2023

*Katherine Kelly Vidal*

Katherine Kelly Vidal
*Director of the United States Patent and Trademark Office*